May 19, 1959 A. C. LUTHER, JR 2,887,575

TELEVISION TRANSMISSION SYSTEM

Filed April 26, 1954

INVENTOR.
Arch C. Luther, Jr.
BY [signature]
ATTORNEY

United States Patent Office 2,887,575

Patented May 19, 1959

2,887,575

TELEVISION TRANSMISSION SYSTEM

Arch C. Luther, Jr., Merchantville, N.J., assignor to Radio Corporation of America, a corporation of Delaware Application April 26, 1954, Serial No. 425,463

5 Claims. (Cl. 250—27)

This invention relates to pulse mixing circuits and more particularly to an improved arrangement for combining or mixing electrical pulses in a non-additive manner.

A synchronizing signal generator which is associated with a television transmitter supplies a component of a video signal train which is referred to as the composite blanking signal. The function of the blanking signal is to blank out the television scanning beam and to open the camera amplifier circuit during retrace periods. Scanning is accomplished by activating the scanning beam in one direction of movement only, and the action of the cathode ray beam is blanked by applying the blanking signal to the scanning beam control means during its return path to the beginning of a line, a field or a complete frame, in order to prevent the production of an undesired retrace line pattern. The composite blanking signal includes horizontal blanking pulses and vertical blanking pulses. The horizontal and vertical blanking pulses are ordinarily generated in separate oscillator circuits in a sync generator and are then added or mixed to form the composite blanking signal. Additive mixing of the horizontal and vetical blanking pulses would result in the horizontal blanking pulses being imposed on top of the vertical blanking pulses, therefore the amplitudes of the vertical blanking pulses would not be the same amplitude as the horizontal blanking pulses.

The present invention in its more general form contemplates a method of, and a device for, non-additively mixing the horizontal blanking pulses and the vertical blanking pulses to form a composite blanking signal in which all output pulses are of substantially the same magnitude. This non-additive mixing is performed by varying a control voltage on an electron discharge device by a predetermined amount regardless of whether a single pulse or a plurality of pulses are applied to the device. An impedance is connected to carry an electrical current and is also connected to a control means of the electron discharge device such that the electron discharge device is controlled by the voltage drop across the impedance. The occurrence of either a single pulse or a multiplicity of pulses will cause the voltage drop across the impedance to decrease and thereby create a predetermined amount of change in the control voltage on said electron discharge device, which is governed by grid current in the electron discharge device. It is therefore an object of this invention to provide an improved form of a pulse mixing circuit.

Another object of this invention is to provide an improved method and apparatus for mixing the vertical and the horizontal blanking signals of a composite video signal.

Another object of this invention is to provide a pulse mixing circuit in which one pulse will be suppressed upon the simultaneous occurrence of another pulse.

A further object of this invention is to provide a blanking pulse mixing circuit in which the output amplitude will be substantially the same for vertical and horizontal blanking pulses.

Other and incidental objects of this invention will be apparent to those skilled in the art from reading the following specification and on inspection of the accompanying drawings in which.

Figure 1:
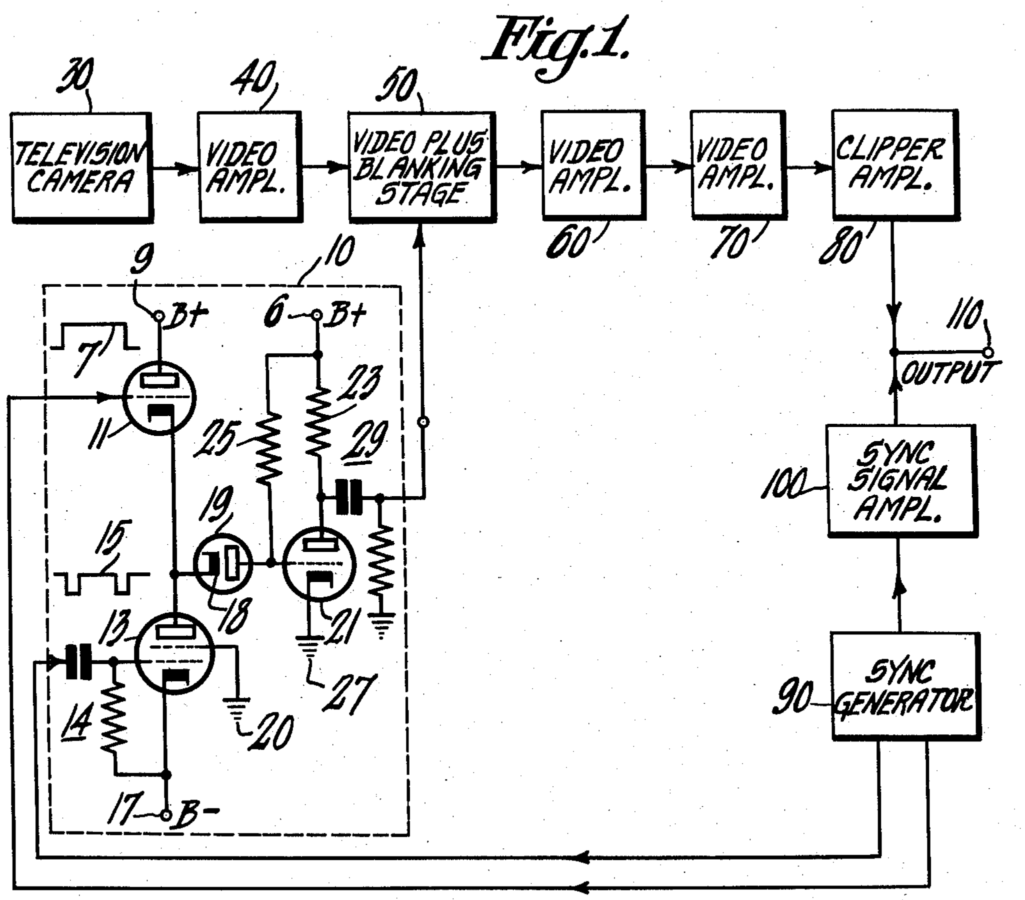
Figure 1 is a block and circuit diagram showing a form of the invention.

Block 30 represents a television camera and the necessary accompanying circuitry to generate a video signal. The video signal from the television camera 30 is coupled to video amplifier 40 and then to a video plus blanking stage 50. Block 10 represents a blanking mixer circuit, the output of which is connected to the video plus blanking stage 50 in which the video signal is combined with the composite blanking signal. The blanking mixer circuit 10 mixes a vertical blanking pulse 7 and a horizontal blanking pulse 15, generated by a sync generator 90. The output from the video plus blanking stage 50 is fed to video amplifiers 60 and 70 where the video plus the composite blanking signal is amplified. The amplified video plus composite blanking signal is then coupled to a clipper amplifier 80 and then to an output terminal 110 where a clipped video plus composite blanking signal is added to a sync signal which is formed in sync generator 90, and amplified in sync signal amplifier 100. The blanking mixer circuit 10 may be incorporated in the sync generator 90. The signal appearing at the output terminal 110 is a composite video signal having the dimensions of the R.M.A. standard. Such a system for generating a video signal is shown and described in "Principles of Television Engineering," by Donald G. Fink, published 1940, page 398.

Referring now more specifically to the blanking mixer circuit 10, a vertical pulse tube 11 has its plate connected to a positive potential terminal 9, and its cathode connected to the plate of a horizontal pulse tube 13. The horizontal blanking pulses 15 (negative going) are coupled to the control grid of the horizontal pulse tube 13 by a horizontal input coupling circuit 14. The horizontal pulse tube 13 has its cathode connected to a negative potential terminal 17, and its screen grid connected to a point of reference potential level 20. The function of the screen grid of the horizontal pulse tube 13 is to provide the usual capacity affecting function usually performed by such a grid. A triode vacuum tube could be used in the practice of this invention in place of the tetrode illustrated for the horizontal pulse tube 13. The vertical pulse tube 11 and the horizontal pulse tube 13 with their associated circuitry function as a non-additive mixer to receive the vertical and the horizontal blanking pulses, amplify the blanking pulses, and feed the pulses on in such a manner that the polarity of all pulses will be the same. The tubes 11 and 13 may also be considered to act as a switch to cut off a normally flowing current with a positive voltage when a pulse is received by either or both of the tubes. In addition the combined circuitry of vertical pulse tube 11 and horizontal pulse tube 13 serves to maintain the potential between the two tubes at a uniform value and allow the passage of a current when no pulses are being received.

The plate of the horizontal pulse tube 13 and the cathode of the vertical pulse tube 11 are connected to a unilateral conducting device, diode 19, in such a manner as to prevent the flow of current away from the plate of the horizontal pulse tube 13. The diode 19 therefore receives on its cathode 18 or pulse input side the output from both of the pulse tubes 11 and 13. The diode 19 is in turn connected to a control grid of a triode tube 21. A load resistor 23 is connected between plate of the triode 21 and a positive potential terminal 6. A resistor 25 is connected between the control grid of the triode 21 and the positive potential terminal 6, and serves to control the bias voltage on the control grid of triode 21. A cathode of the triode 21 is connected to the point of reference potential level 20. The triode 21 and its associated circuitry serves to limit the amplitude of pulses received, by going to a grid current level of conduction whenever pulses over a predetermined magnitude are received. An output coupling circuit 29 is so connected as to receive the output from the triode 21 and to convey the output to the video and blanking stage 50.

Figure 2:
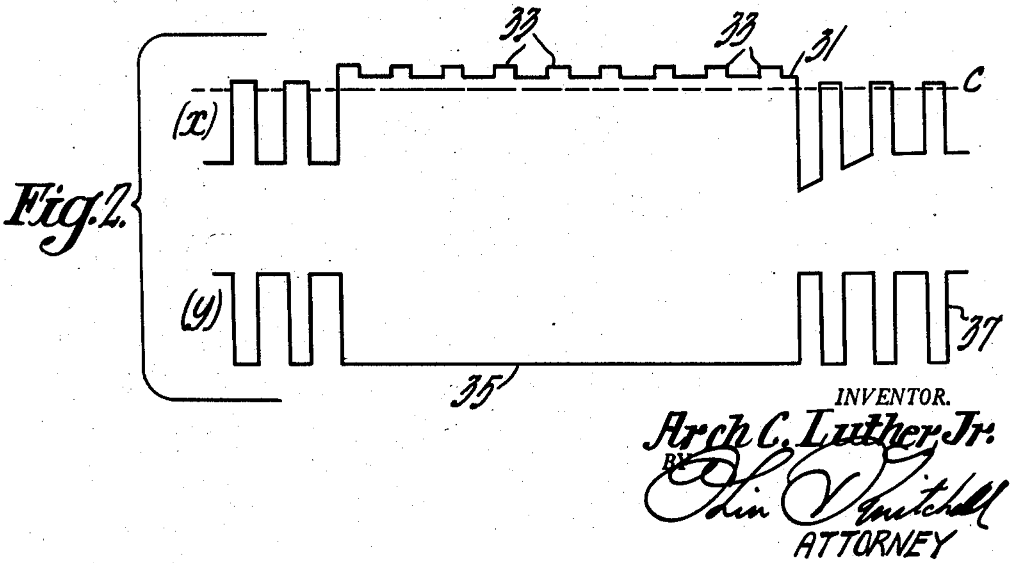
Figure 2 shows curves representative of waveforms of voltages generated within the circuit represented by the diagram shown in Figure 1.

An understanding of the operation of the circuit of the blanking mixer circuit 10 may be furthered by considering the operation of the circuit with reference to the curves of Figure 2. The curves of Figure 2 are approximate representations of voltage magnitudes plotted as the ordinate and with time as the abscissa. Curve X represents the voltage occurring at the cathode 18 of diode 19 during the operation of the circuit when both a vertical blanking pulse 7 and a horizontal blanking pulse 15 are being received. Curve Y represents the composite blanking voltage wave derived from the blanking mixer circuit 10.

During the operation of the blanking mixer circuit 10, consider first a quiescent state when neither the vertical blanking pulse 7 nor the horizontal blanking pulse 15 is being received. A current flows from the positive potential terminal 6 through resistance 25, diode 19, and the horizontal pulse tube 13 to the negative potential terminal 17. This current maintains a potential on the control grid of the triode 21, such that the triode 21 will be rendered non-conducting. The vertical pulse tube 11 carries a slight current to aid in the maintenance of the desired non-conducting potential on the control grid of the triode 21. Upon the occurrence of a negative horizontal pulse 15, the horizontal pulse tube 13 is cut off. As a result, the current through the resistor 25 is stopped and the voltage on the control grid of triode 21 rises, causing the triode 21 to conduct and form an output pulse in the output coupling circuit 29. The magnitude of current in the triode 21 continues to rise until it is limited by the tube 21 drawing grid current.

Consider now the application of a vertical blanking pulse 7 to the vertical pulse tube 11. This pulse places the vertical pulse tube 11, which is normally substantially non-conducting, in a state of heavy current conduction. The current passing through the vertical pulse tube 11 also passes through horizontal pulse tube 13 to the negative potential terminal 17. The result of this current is to raise the potential of the cathode 18 of diode 19 in a positive direction, thereby placing the diode 19 in a cut off state. With the diode 19 cut off, current normally flowing through the resistor 25 is stopped and the voltage on the control grid of the triode 21 again rises to cause the triode 21 to conduct. Again the conduction will be limited by grid current in triode 21. During the conduction of the triode 21, an output voltage variation will be received and fed to video plus blanking stage 50.

Consider now the simultaneous occurrence of a vertical blanking pulse 7 and a horizontal blanking pulse 15. The vertical blanking pulse 7 causes the vertical pulse tube 11 to conduct, thereby preventing current flow through diode 19. The occurrence of the horizontal blanking pulse 15 will cut off the conduction of tube 13, causing cathode 18 of the diode 19 to rise in potential level as shown in curve X by horizontal blanking pulse 33 rising above vertical blanking pulse 31. The voltage level at the cathode of tube 11 changes very little when tube 13 is alternately rendered conducting and non-conducting. The slight change in voltage of the cathode of tube 11 accompanying the cutoff of tube 13 is due to the cathode follower action of tube 11, which necessitates that the voltage on the cathode of the tube 11 follow the voltage on the grid of the tube 11. A dash line C indicates the level at which the diode A will cease to conduct. Any additional increase in voltage above the level of line C will have no effect upon the conduction of mixing tube 21. It can therefore be seen that with the simultaneous occurrence of two pulses, the effect will nevertheless be merely to bias the pulse input side 18 of the unilateral conducting device 19 at a point beyond cutoff where it can not carry a current, thereby causing a decrease in current through resistance 25 causing the control grid of mixing tube 21 to rise in potential until grid current in triode 21 is drawn and rendering triode 21 conducting. Curve Y of Figure 2 shows the voltage wave from the plate of triode 21. This wave Y has been inverted by normal amplifier action and has been clipped in magnitude.

The diode 19 could be eliminated in the practice of the invention. The effect would be to bias the grid of triode 21 positively directly or through a resistance rather than through diode 19, or to switch off the normally flowing current in resistance 25 by raising the potential at the grid of tube 21.

Having thus described the invention, what I claim as new and desire to secure by Letters Patent is:

1. A non-additive mixing circuit arrangement including a pair of electron discharge systems connected in series, means to apply energizing potential across said series circuit, one of said systems normally conducting heavily with respect to the normal conduction of the other, an electron discharge device having a control grid, unilateral conducting means interconnecting the junction between said electron discharge systems and the control grid of said electron discharge device, means including said one electron discharge system and said unilateral conducting means to apply energizing potential to said electron discharge device to maintain said electron discharge device normally blocked, means to apply a negative going pulse to said one electron discharge system to block the same and render said unilateral conducting means non-conducting and said electron discharge device conducting, and means to apply a positive going pulse to said other electron discharge system to increase conduction thereof and render said unilateral conducting means non-conducting and said electron discharge device conducting.

2. A non-additive mixing circuit arrangement including, a pair of electron discharge systems connected in series, means to apply energizing potential across said series circuit, one of said systems normally conducting heavily with respect to the normal conduction of the other, an electron discharge device having a cathode, a grid and an anode, a diode device having a cathode connected to the junction between said electron discharge systems and an anode connected to the grid of said electron discharge device, means including said one electron discharge system and said diode device to apply energizing potential to said electron discharge device to maintain said electron discharge device normally blocked, means to apply a negative going pulse to said one electron discharge system to block the same and render said electron discharge device conducting, and means independent of the other pulse applying means to apply a positive going pulse to said other electron discharge system to increase conduction thereof and render said electron discharge device conducting.

3. A pulse train combining circuit arrangement including, a resistance element, a diode element and one electron discharge device connected in series circuit relationship and poled normally to effect current flow in said series circuit upon the application of direct energizing potential across said series circuit, another electron discharge device having a grid connected to the junction between said resistance element and said diode element, a cathode connected to a point of fixed reference potential and an anode, said other electron discharge device normally being blocked, means to apply a train of negative going pulses to said one electron discharge device to block the same and render said other electron discharge device conducting during the intervals of said pulses to repeat the same at the anode of said other electron discharge device, a further electron discharge device having a cathode connected to the junction between said diode element and said one electron discharge device, a grid, and an anode to which direct energizing potential is applied, and means independent of the other pulse applying means to apply a train of positive going pulses to the grid of said further electron discharge device to render said device conducting and to render said other electron discharge device conducting during the intervals of said positive going pulses to produce negative going pulses of the same duration at the anode of said other electron discharge device.

4. A pulse train combining circuit arrangement, including a resistance element, a diode element, and one electron discharge device connected in series circuit relationship and poled normally to effect current flow in said series circuit upon the application of direct energizing potential across said series circuit, another electron discharge device having a grid connected to the junction between said resistance element and said diode element, a cathode connected to a point of fixed reference potential and an anode, said other electron discharge device normally being blocked, means to apply a train of negative going pulses to said one electron discharge device to block the same and render said other electron discharge device conducting during the intervals of said pulses to repeat the same at the anode of said other electron discharge device, a further electron discharge device having a cathode connected to the junction between said diode element and said one electron discharge device, a grid, and an anode to which direct energizing potential is applied, and means independent of the other pulse applying means to apply a train of positive going pulses to the grid of said further electron discharge device to render said device conducting and to render said other electron discharge device conducting during the intervals of said positive going pulses to produce negative going pulses of the same duration at the anode of said other electron discharge device, said other electron discharge device being arranged to draw grid current in order to limit the amplitude of the pulses developed at the anode thereof.

5. A non-additive pulse mixing circuit comprising, a source of energizing potential having relatively positive and negative terminals, first and second electron discharge devices connected in series between said positive and negative terminals, said discharge devices including control electrodes, a resistor and a diode coupled from said positive terminal to the junction between said first and second devices, a third electron discharge device having a control electrode coupled to the junction between said resistor and diode, a source of positive-going pulses coupled to the control electrode of said first device, a source of negative going pulses coupled to the control electrode of said second device, and means including said second device to energize said third device so that said third device is normally non-conducting and when pulses are coupled from one or both of said sources to said first and second devices, said diode is rendered non-conducting and said third device is rendered fully conducting, whereby a train of constant amplitude pulses is available from said third device.

References Cited in the file of this patent

UNITED STATES PATENTS

| | | |
|---|---|---|
| 2,363,809 | Schade | Nov. 28, 1944 |
| 2,516,356 | Tull et al. | July 25, 1950 |
| 2,543,442 | Dench | Feb. 27, 1951 |
| 2,543,462 | Longmire | Feb. 27, 1951 |
| 2,624,770 | Yetter | Jan. 6, 1953 |
| 2,633,528 | Hutson | Mar. 31, 1953 |
| 2,729,699 | Long | Jan. 3, 1956 |
| 2,769,905 | Ropiequet | Nov. 6, 1956 |